V. WHITESIDE.
VACUUM GAUGE.
APPLICATION FILED JUNE 12, 1920.
1,430,610.
Patented Oct. 3, 1922.
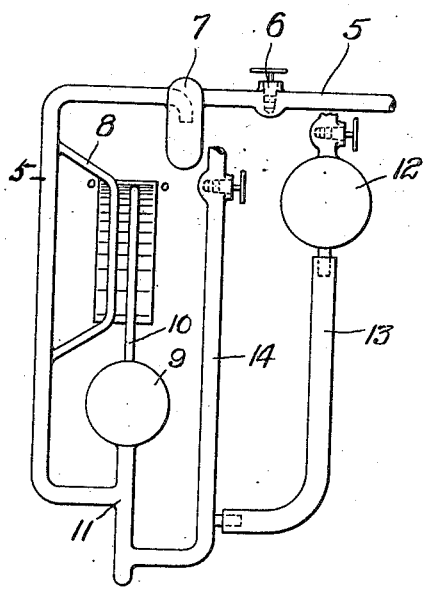
Inventor
Victor Whiteside
by G.W.Campbell
Atty.

Patented Oct. 3, 1922.

1,430,610

UNITED STATES PATENT OFFICE.

VICTOR WHITESIDE, OF LA GRANGE, ILLINOIS, ASSIGNOR TO WESTERN ELECTRIC COMPANY, INCORPORATED, OF NEW YORK, N. Y., A CORPORATION OF NEW YORK.

VACUUM GAUGE.

Application filed June 12, 1920. Serial No. 388,428.

*To all whom it may concern:*

Be it known that I, VICTOR WHITESIDE, a citizen of the United States, residing at La Grange, in the county of Cook and State of Illinois, have invented certain new and useful Improvements in Vacuum Gauges, of which the following is a full, clear, concise, and exact description.

This invention relates to improvements in vacuum gauges of the type in which rarefied air or gas from the vessel to be evacuated is admitted into a chamber of known volume and compressed in a small space in the end of the chamber by the rise of mercury in the chamber, the volume of the compressed gas being the measure of the vacuum. The gauge in this respect is substantially the same as that known as the McLeod vacuum gauge, which is described in Ganot's Physics, 18th edition, page 204.

The object of this invention is to provide a commercial form of vacuum gauge of this type which will not be subject to errors in measurement due to the presence of asmospheric air within the system of chambers and connections. In accordance with the features of this invention provision is made for preventing atmospheric air from entering the chamber in which the rarefied air or gas is compressed and measured. Specifically, the invention consists in the provision of means interposed between the air chamber and a mercury container for trapping and leading off atmospheric air which finds entrance to the gauge through the connections of the mercury container therewith or otherwise.

The drawing is a view in front elevation of a gauge embodying the features of this invention. As shown in this drawing, 5 designates a main line leading to the vessel to be evacuated, which vessel is not shown. 6 is a stop cock in this tube, and 7 is a trap which is interposed in the main line for the purpose of preventing oil from the vacuum pump backing up in the gauge, or for preventing the mercury of the gauge being forced into the main line 5. The main line 5 has a by-pass 8 provided therein and is connected with the chamber 9—10 at the point 11. The chamber 9—10 is of known volume, and the part 10 thereof is capillary. The by-pass 8 and the capillary portion 10 are of the same interior diameter, and a scale located adjacent the portions 8 and of at the top. 10 is graduated with the zero portion there- The mercury container 12 is connected through the agency of a flexible rubber tube 13 with the chamber 9—10 through an air trap or outlet 14 which is provided for the purpose of preventing atmospheric air which may leak in through the connections of the flexible rubber tube 13 with the container 12 and the chamber 9—10, from entering the chamber 9—10 and thereby causing an error in the reading of the gauge.

The operation of the gauge is briefly as follows:

The mercury container 12 is lowered until the mercury runs out at the vacuum gauge below the level 11, and the rarefied air or gas is admitted through the main line 5 into the chamber 9—10. The mercury container is then raised, permitting the mercury to run back into the gauge, and as it reaches the level 11 it traps the rarefied air in the chamber 9—10, and as the mercury continues to rise in the chamber 9—10 and by-pass 8, the rarefied air in the chamber 9—10 will be compressed into a small space at the top of the capillary portion 10. The container 12 is raised until the mercury in the by-pass 8 reaches the level indicated by zero on the scale, and the level of the mercury in chamber 9—10 will be a measure of the vacuum connected with the main line 5.

By means of the trap or outlet 14, which prevents the atmospheric air from entering the chamber 9—10, no complicated and expensive joints are required between the connection of the mercury container with the chamber for preventing the atmospheric air entering the gauge, since this trap and outlet 14 will accomplish this purpose and will permit the escape of all atmospheric air before it enters the chamber 9—10, thereby causing an error in the reading. A gauge of this type is simple in structure, accurate in its operation, and readily adapted to the commercial testing of vacuums.

What is claimed is:

1. In a vacuum gauge or measuring device, an air chamber, connecting means between said chamber and a vessel to be evacuated, a mercury container, a flexible connection between the mercury container and the air chamber whereby said container and chamber may be relatively positioned to allow rarefied gas from the evacuated vessel to enter the chamber and in another position thereof to compress the rarefied gas in the chamber, and means for preventing the atmospheric air entering the air chamber.

2. In a vacuum gauge or measuring device, an air chamber, connecting means between said chamber and a vessel to be evacuated, a mercury container, a flexible rubber tube connecting the mercury container with the air chamber at a point below where the chamber is connected to the vessel to be evacuated whereby rarefied gas from the vessel to be evacuated may enter the chamber when said container is positioned below the chamber and when positioned thereabove to compress the rarefied gas in the chamber, and means interposed between the flexible connection and the air container for preventing atmospheric air which may leak through the flexible tube and its connecting points from entering the air chamber.

3. In a vacuum gauge or measuring device, an air chamber, connecting means between said chamber and a vessel to be evacuated, a mercury container, a flexible rubber tube connecting the mercury container with the air chamber at a point below where the chamber is connected to the vessel to be evacuated whereby said container may be positioned below said chamber to allow rarefied gas from the evacuated vessel to enter the chamber and upon positioning the container above the chamber to compress the rarefied gas therein, and a trap having an outlet for atmospheric air interposed between the flexible rubber tube and the air chamber.

4. In a vacuum gauge or measuring device, an air chamber, connecting means between said chamber and a vessel to be evacuated, a mercury container, a flexible rubber tube connecting the mercury container with the air chamber at a point below where the chamber is connected to the vessel to be evacuated whereby said container may be positioned below said chamber to allow rarefied gas from the evacuated vessel to enter the chamber and upon positioning the container above the chamber to compress the rarefied gas therein, and a trap having an outlet for atmospheric air interposed between the point of connection of the vessel to be evacuated with the chamber and the point of connection of the flexible rubber tube with the chamber.

In witness whereof, I hereunto subscribe my name this 25th day of May, A. D., 1920.

VICTOR WHITESIDE.